(12) United States Patent
Matus et al.

(10) Patent No.: US 11,990,113 B2
(45) Date of Patent: May 21, 2024

(54) DRONE NOISE CANCELLATION USING SOUND BEAMS

(71) Applicant: UAVPatent Corp., Carson City, NV (US)

(72) Inventors: George Michael Matus, Salt Lake City, UT (US); Shawn Ray Nageli, South Jordan, UT (US)

(73) Assignee: UAVPatent Corp., Carson City, NV (US)

( * ) Notice: Subject to any disclaimer, the term of this patent is extended or adjusted under 35 U.S.C. 154(b) by 108 days.

(21) Appl. No.: 17/659,682

(22) Filed: Apr. 19, 2022

(65) Prior Publication Data

US 2022/0343890 A1  Oct. 27, 2022

Related U.S. Application Data

(60) Provisional application No. 63/178,382, filed on Apr. 22, 2021.

(51) Int. Cl.
*G10K 11/178* (2006.01)
*B64C 39/02* (2023.01)
(Continued)

(52) U.S. Cl.
CPC ...... *G10K 11/17827* (2018.01); *B64C 39/024* (2013.01); *B64D 47/08* (2013.01);
(Continued)

(58) Field of Classification Search
CPC ....... G10K 11/17827; G10K 11/17823; G10K 11/17873; G10K 11/17854; G10K 2200/10; G10K 2210/1281; G10K 2210/3027; G10K 2210/3028; G06T 7/70; G06T 2207/10032; G06V 20/17; G06V 2201/07; G05D 1/0094; G05D 1/12; G10L 21/0232; G10L 25/18; G10L 25/51; G10L 2021/02166; H04R 1/323; H04R 1/406; H04R 3/005; B64C 39/024; B64C 2220/00; B64D 47/08; B64U 10/13; B64U 2101/30
(Continued)

(56) References Cited

U.S. PATENT DOCUMENTS

9,489,937 B1 * 11/2016 Beard ................. G10K 11/178
2005/0195989 A1 * 9/2005 Sato ...................... B25J 13/003
381/94.1
(Continued)

*Primary Examiner* — Vivian C Chin
*Assistant Examiner* — Douglas J Suthers (57) ABSTRACT

A drone includes a motor, a noise receiver, a camera, a distance measurer, and a directed sound beam generator. The noise receiver is configured to detect a noise caused by the motor. The camera is configured to capture an image of an area when the drone is in the air. The distance measurer is configured to measure a distance between the drone and a particular point in the captured image. The directed sound beam generator is configured to emit a sound beam that is directed to a particular direction. The drone further includes a processor configured to analyze the detected noise to determine a frequency spectrum of the detected noise. The processor is further configured to analyze the captured image to identify a target, and cause the directed sound beam generator to emit a sound beam to actively cancel at least a portion of the noise directed to the target.

20 Claims, 5 Drawing Sheets

(51) Int. Cl.

| | | |
|---|---|---|
| B64D 7/08 | (2006.01) | |
| B64D 47/08 | (2006.01) | |
| B64U 10/13 | (2023.01) | |
| G05D 1/00 | (2006.01) | |
| G06T 7/70 | (2017.01) | |
| G06V 20/17 | (2022.01) | |
| G10L 21/0216 | (2013.01) | |
| G10L 21/0232 | (2013.01) | |
| G10L 25/18 | (2013.01) | |
| G10L 25/51 | (2013.01) | |
| H04R 1/32 | (2006.01) | |
| H04R 1/40 | (2006.01) | |
| H04R 3/00 | (2006.01) | |
| B64U 101/30 | (2023.01) | |

(52) U.S. Cl.
CPC ............ *G05D 1/0094* (2013.01); *G05D 1/12* (2013.01); *G06T 7/70* (2017.01); *G06V 20/17* (2022.01); *G10K 11/17823* (2018.01); *G10K 11/17854* (2018.01); *G10K 11/17873* (2018.01); *G10L 21/0232* (2013.01); *G10L 25/18* (2013.01); *G10L 25/51* (2013.01); *H04R 1/323* (2013.01); *H04R 1/406* (2013.01); *H04R 3/005* (2013.01); *B64C 2220/00* (2013.01); *B64U 10/13* (2023.01); *B64U 2101/30* (2023.01); *G06T 2207/10032* (2013.01); *G06V 2201/07* (2022.01); *G10K 2200/10* (2013.01); *G10K 2210/1281* (2013.01); *G10K 2210/3027* (2013.01); *G10K 2210/3028* (2013.01); *G10L 2021/02166* (2013.01)

(58) Field of Classification Search
USPC ..................................... 381/71.11
See application file for complete search history.

(56) References Cited

U.S. PATENT DOCUMENTS

| | | | | |
|---|---|---|---|---|
| 2016/0063987 | A1* | 3/2016 | Xu | G10K 11/17881 381/71.14 |
| 2018/0075834 | A1* | 3/2018 | Fong | G10K 11/178 |
| 2019/0130889 | A1* | 5/2019 | Matus, Jr. | G10K 11/178 |
| 2021/0142776 | A1* | 5/2021 | Sadhwani | G05D 1/0094 |

\* cited by examiner

DRONE NOISE CANCELLATION USING SOUND BEAMS

CROSS-REFERENCE TO RELATED APPLICATIONS

This application claims the benefit of, and hereby incorporates by reference in its entirety for all purposes, U.S. Provisional Application No. 63/178,382, filed Apr. 22, 2021 and entitled "Drone Sound Beam".

BACKGROUND

Drones can be used for many purposes, including but not limited to aerial surveillance. Aerial surveillance may involve the close observation of a person, group of people, behaviors, activities, infrastructure, buildings, and etc. for the purpose of managing, influencing, directing, and/or protecting assets. Drones can enter narrow and confined spaces and be equipped with various sensors, such as night vision cameras and thermal sensors, allowing them to provide imagery that the human eye is unable to detect. Drones can also be deployed instantly when needed with much less cost than a helicopter.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

This summary represents non-limiting embodiments of the disclosure. This summary is provided to introduce a selection of concepts in a simplified form that is further described below in the detailed description. This summary is not intended to identify key features or essential features of the claimed subject matter, nor is it intended to be used as an aid in determining the scope of the claimed subject matter.

The embodiments described herein are related to a drone having a sound system configured to actively canceling its own noise directed to a target and/or receiving sound waves emitted by the target. The drone includes a motor, a noise receiver, a camera, a distance measurer, a directed sound beam generator, a computer-readable medium, and a processor. The motor is configured to power the drone. The motor also causes various parts of the drone to vibrate to generate noise. The noise receiver is configured to detect the noise caused by the motor. The camera is configured to capture an image of an area when the drone is in the air. The distance measurer is configured to measure a distance between the drone and a particular point shown in the captured image. The directed sound beam generator is configured to emit a sound beam that is directed to a particular direction.

The computer-readable medium is configured to store computer-executable instructions. When the processor executes the computer-executable instructions, the processor is configured to analyze the detected noise to determine a frequency spectrum of the detected noise. The processor is also configured to analyze the captured image to identify a target and cause the distance measurer to determine a distance between the drone and the target. The processor is further configured to cause the directed sound beam generator to emit a sound beam (also referred to as a "first sound beam") based on the detected noise, the frequency spectrum of the detected noise, a relative direction of the target from the drone, and/or the determined distance between the drone and the target. The sound beam is directed to the target and configured to actively cancel at least a portion of the detected noise directed at the target.

In some embodiments, the processor is further configured to cause the directed sound beam generator to generate a second sound beam that includes a voice message. The first sound beam that cancels at least a portion of the detected noise and the second sound beam that includes the voice message are merged into a single sound beam and/or emitted simultaneously at the target.

In some embodiments, the directed sound beam generator includes a gimbal configured to change a direction of the sound beam. Based on the relative direction of the target from the drone, the processor is configured to cause the gimbal to rotate to follow the target, such that the sound beam is continuously emitted at the target even when the target and/or the drone are moving.

In some embodiments, the drone further includes a communication interface configured to receive an instruction wirelessly from a remote control. In some embodiments, the instruction includes information related to the target. In some embodiments, in response to receiving the instruction, the processor is further configured to analyze the captured image to identify a potential target, and determine whether the potential target corresponds to the information related to the target received from the instruction. In response to determining that the potential target corresponds to the information related to the target, the potential target is identified as the target.

In some embodiments, in response to identifying the target, the processor is configured to cause the camera to follow the target and keep the target at a center of each image taken. The processor also causes the camera to take images of the target at a predetermined time interval. Notably, when the predetermined time interval is sufficiently short, the images taken by the camera form a video. In some embodiments, the camera is coupled to a second gimbal. The processor is configured to cause the second gimbal to rotate to keep the target at a center of each image taken by the camera. In some embodiments, the second gimbal and the gimbal of the directed sound beam generator are a same gimbal.

In some embodiments, the processor is configured to record at least a subset of images in the computer-readable medium and transmit at least a subset of the recorded images to the remote control via the wireless communication channel.

In some embodiments, the drone further includes a sound receiver configured to receive and process a sound wave emitted by the target to extract a voice message. In some embodiments, the voice receiver includes a microphone array having a plurality of microphones. Each of the plurality of microphones is configured to detect a sound wave. In some embodiments, the processor is further configured to record the sound wave received from each of the plurality of microphones in the computer-readable medium and process the recorded signals to extract a voice message. In some embodiments, the processing of the recorded sound waves includes generating a noise filter based on the detected noise. The noise filter is configured to filter out at least a portion of the frequency spectrum of the detected noise from the recorded sound waves.

In some embodiments, for each sound wave generated by each of the plurality of microphones, the processor uses the noise filter to filter the sound wave to reduce noise and enhance human voice to generate a processed sound wave. The processed sound waves are then aggregated into an aggregated sound wave. The aggregated sound wave is then processed to extract the voice message. Alternatively, the sound waves received by the plurality of microphones are aggregated into an aggregated sound wave. The aggregated sound wave is then filtered by the noise filter to generate a filtered sound wave. The filtered sound wave is then processed to extract the voice message.

In some embodiments, the noise receiver includes a sensor coupled to the motor or an outer surface of the drone. In some embodiments, the noise receiver and the sound receiver share the microphone array, such that the microphone array is configured to detect both the noise and the sound wave emitted by the target.

Additional features and advantages will be set forth in the description that follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

Figure 1:
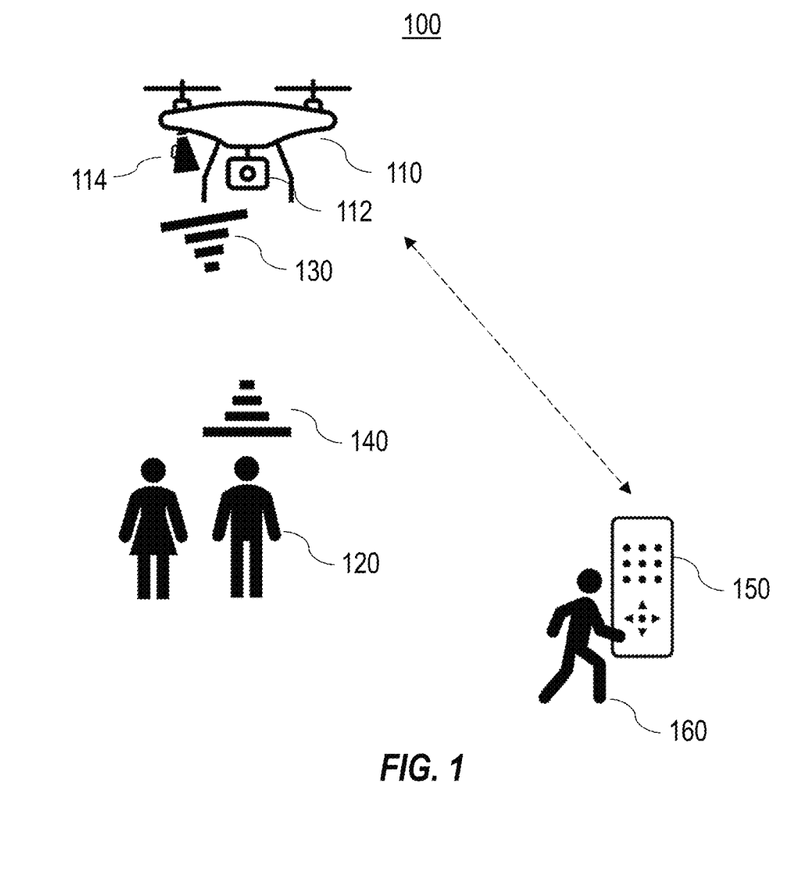
FIG. 1 illustrates an example of an environment, in which the principles described herein may be employed.

The embodiments described herein are related to a drone having a sound system configured to actively canceling its own noise directed to a target and/or receiving sound waves emitted by the target. FIG. 1 illustrates an example of an environment 100, in which the principles described herein are employed. As illustrated, a drone 110 is configured to visually identify a target 120 and track the identified target 120. Further, the drone 110 is configured to detect its own noise and generate a directed sound beam 130 that is directed to the target 120. The directed sound beam 130 is configured to actively cancel the drone's noise directed to the target 120. As such, the drone 110 can be kept quiet and not be noticed by the target while surveilling the target.

In some embodiments, the drone 110 includes a camera 112 and a directed sound beam generator 114. The camera 112 is configured to capture an image of an area. The captured image is then processed to identify a target. The sound beam generator 114 is configured to generate a directed sound beam 130. In some embodiments, each of the camera 112 and a sound beam generator 114 is coupled to a same or a separate gimbal and/or gyroscope. The gyroscope is configured to identify a horizontal direction and/or a vertical direction. The gimbal is configured to allow the camera and/or the directed sound beam generator to point at any desired direction. In some embodiments, the camera and the directed sound beam generator may share a same gimbal and/or a gyroscope. In some embodiments, each of the camera 112 and the directed sound beam generator 114 has its own gimbal and/or gyroscope.

In some embodiments, the drone 110 is further configured to receive sound wave 140 emitted by the target 120. Since the received sound wave 140 also includes the noise generated by the drone, the received sound wave is further processed to remove at least a portion of such noise and to enhance the human voice.

Further, in some embodiments, the drone 110 is configured to be controlled by a remote control 150. A user 160 can control the drone 110 using the remote control 150. For example, in some embodiments, the user 160 may use the remote control 150 to send instructions to the drone 110. In some embodiments, the drone 110 may transmit its captured images, videos and/or audios to the remote control 150.

Figure 2:
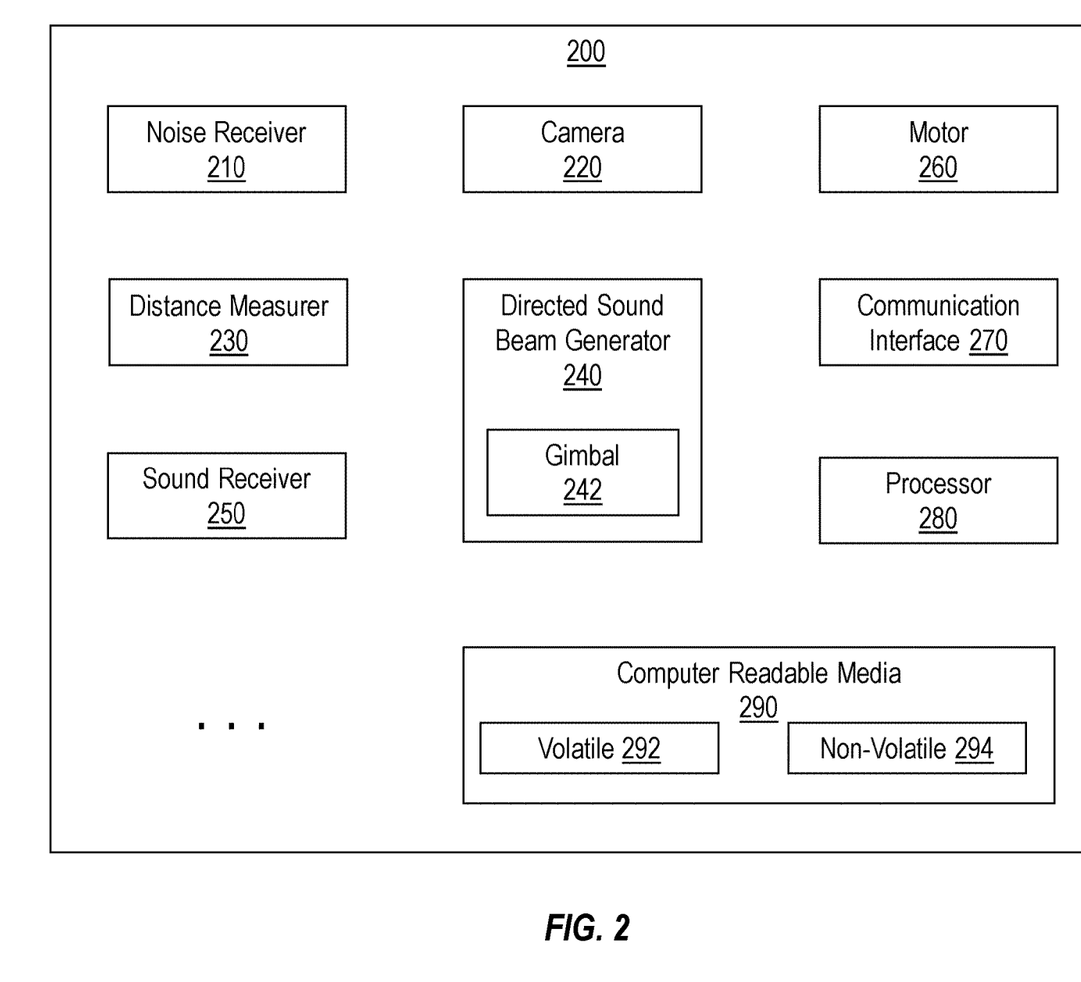
FIG. 2 illustrates an example of an architecture of a drone that implements the principles described herein.

FIG. 2 illustrates an example of an architecture of a drone 200 (which corresponds to the drone 110 of FIG. 1). As illustrated in FIG. 2, the drone 200 includes a motor 260, a noise receiver 210, a camera 220, a distance measurer 230, a directed sound beam generator 240. The motor 260 is configured to power the drone. The motor also causes various structural parts of the drone to vibrate to generate noise. The noise receiver 210 is configured to detect the noise caused by the motor. The camera 220 is configured to capture an image of an area when the drone is in the air. The distance measurer 230 is configured to measure a distance between the drone and a particular point shown in the captured image. In at least one embodiment, the distance measurer 230 comprises the camera 220 functioning to identify the distance to objects of interest within its field of view. The directed sound beam generator 240 (which may include a special sound wave driver) is configured to emit a narrow beam of sound that is directed in a particular direction. In some embodiments, the directed sound beam generator 240 includes a gimbal 242 configured to allow the directed sound beam generator 240 to point at any direction.

In some embodiments, the noise receiver 210 may include a sensor coupled to the motor 260 or an outer surface of the drone 200. Alternatively, or in addition, the noise receiver 210 may include a microphone array that is distributed at different locations of an outer surface of the drone 200. In some embodiments, the camera 220 may include a plurality of cameras 220, each of which may point in a different direction or be specialized at taking a particular type of images (such as, but not limited to, a daytime camera, a night-vision camera, an infrared camera, a thermal camera, etc.).

The drone 200 also includes a processor 280 and one or more computer-readable media 290. The one or more computer-readable media 290 may include one or more volatile media 292 (such as a RAM) and/or one or more non-volatile media 294 (such as an SSD). The one or more computer-readable media 290 stores computer-executable instructions. When the computer-executable instructions are executed by the processor 280, the processor 280 is configured to analyze the detected noise to determine a frequency spectrum of the detected noise. The processor 280 is also configured to analyze the captured image to identify a target. In some embodiments, the computer-executable instructions include machine-learned models that are configured to determine whether the target is on the image or not.

In response to determining that the target is on the image, the processor is further configured to cause the distance measurer 230 to determine a distance between the drone and the target. Based on the detected noise, the frequency spectrum of the detected noise, a relative direction of the target from the drone 200, and/or the determined distance between the drone and the target, the processor 280 causes the directed sound beam generator 240 to emit a sound beam at the target. The sound beam is configured to actively cancel at least a portion of the detected noise directed at the target. In particular, the sound beam includes a sound wave with a substantially same amplitude as that of the noise, but with an opposite phase, such that the generated sound beam actively cancels out the noise.

Notably, amplitudes of sound in different frequency bands fade differently within a same distance. For example, lower frequency sounds generally carry longer distances in the air. As such, in some embodiments, when the distance between the drone and the target is greater than a threshold, certain high-frequency sound waves can be ignored. Alternatively, or in addition, the further the distance between the drone and the target is, the greater a frequency band of sound waves (from the higher frequency side) can be ignored.

In some embodiments, the processor is further configured to cause the directed sound beam generator 240 to generate a second sound beam that includes a voice message. The first sound beam that cancels at least a portion of the detected noise and the second sound beam that includes the voice message are merged into a single sound beam and/or emitted simultaneously at the target.

In some embodiments, the directed sound beam generator 240 includes a gimbal 242 configured to change a direction of the sound beam. Based on the relative direction of the target from the drone 200, the processor is configured to cause the gimbal to follow the target, such that the sound beam is emitted at the target continuously.

In some embodiments, the drone 200 further includes a communication interface 270 configured to receive an instruction wirelessly from a remote control. The instruction includes information related to the target. In some embodiments, in response to receiving the instructions, the processor 280 is further configured to analyze the captured image to identify a potential target. For example, the processor 280 may be configured to identify human faces on the captured image. Each identified human face may be deemed as a potential target. The processor 280 then determines whether the potential target corresponds to the information related to the target received from the instruction. For example, the information related to the target may include a 3D model of the face of the target. The processor 280 is configured to compare each identified human face with the received 3D model. In some embodiments, the processor 280 is configured to compute a similarity score for each potential target, indicating the similarity between the potential target and the target.

In some embodiments, when the similarity score is greater than a predetermined threshold, the processor 280 determines that the potential target is the target. Alternatively, or in addition, in some embodiments, when the similarity score is greater than a threshold, the processor 280 sends the image of the potential target to the remote control. A user at the remote control can review the image and manually determine whether the potential target is the target and sends the determination back to the drone 200 via the wireless communication interface 270

In some embodiments, in response to identifying the target, the processor 280 is configured to cause the camera to follow the target and keep the target at a center of the image taken, and the processor 280 may also cause the camera 220 to take images of the target at a predetermined time interval. Notably, when the predetermined time interval is sufficiently short, the images taken by the camera 220 would form a video. In some embodiments, the camera 220 also includes a gimbal (also referred to a second gimbal). The processor 280 is configured to cause the second gimbal to rotate to keep the target at a center of each image taken. In some embodiments, the processor 280 is further configured to cause the drone to approach the target and hover over the target at a predetermined distance.

In some embodiments, the processor 280 is configured to record at least a portion of the sequence of images in the computer-readable medium and transmit at least a portion of the recorded images to the remote control via the wireless communication interface 270.

In some embodiments, in response to identifying the target, the processor 280 sets the drone 200 into a lock-on mode. When the drone 200 is in the lock-on mode, the camera 220 and the directed sound beam generator 240 are both configured to follow the target. In some embodiments, when the drone 200 is in the lock-on mode, each of the noise receiver 210 and the distance measurer 230 is configured to detect a current noise, a current relative direction of the target, current distance between the drone and the target at a predetermined time interval, and the directed sound beam generator 240 is configured to adjust its direction and active noise cancellation based on the currently detected noise, the current relative direction of the target, and the current distance between the drone and the target.

In some embodiments, the drone 200 further includes a sound receiver 250 configured to receive and process a sound wave emitted by the target to extract a voice message. In some embodiments, the processor is further configured to transmit the voice message to the remote control via the wireless communication interface.

In some embodiments, the sound receiver 250 includes a microphone array having a plurality of microphones, each of which is placed at a different location of an outer surface of the drone 200 and configured to receive a sound wave. The processor 280 is further configured to record the sound wave received from each of the plurality of microphones in the computer-readable medium 290 and process the recorded sound waves to extract a voice message. The processing of the recorded sound waves may be based on various machine-learned models.

In some embodiments, the processing of the recorded sound waves further includes generating a noise filter based on the detected noise and the spectrum of the detected noise.

The noise filter is configured to filter out at least a portion of the frequency spectrum of the detected noise from the sound waves received by the plurality of microphones. In some embodiments, for each sound wave received from each of the plurality of microphones, the processor 280 uses the noise filter to process the sound wave to reduce noise and enhance human/target voice to generate a processed sound wave. The processor then aggregates the processed sound waves into an aggregated signal and extracts a voice message from the aggregated signal. Alternatively, the processing of the recorded sound waves includes aggregating the processed sound waves received from the plurality of microphones into an aggregated sound wave. The processor 280 then uses the noise filter to process the aggregated sound wave to reduce noise and enhance human/target voice to generate a processed sound wave and extract a voice message from the processed sound wave.

In some embodiments, the sound receiver 250 and the noise receiver 210 share a same microphone array, such that the microphone array is configured to detect both the noise and the sound emitted from the target.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
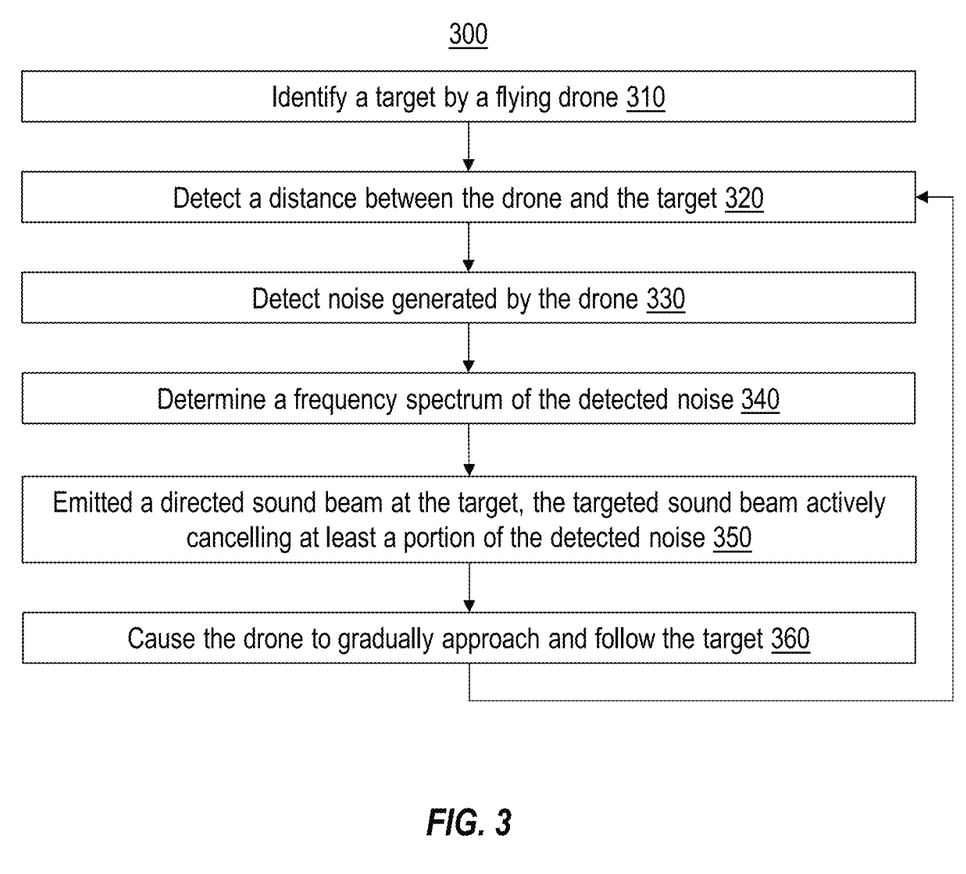
FIG. 3 illustrates a flowchart of an example of a method for emitting a directed sound beam at a target to actively cancel at least a portion of noise generated by a motor of a drone.

FIG. 3 illustrates a flowchart of an example of a method 300 for generating a target sound beam that actively cancels a noise directed to a target. The method 300 includes identifying a target by a flying drone (act 310). The method 300 further includes detecting a distance between the drone and the target (act 320). The method 300 further includes detecting noise generated by the drone (act 330) and determining a frequency spectrum of the detected noise (act 340). Based on the distance between the drone and the target, a relative direction of the target from the drone, the detected noise, and/or the frequency spectrum of the detected noise, a directed sound beam is emitted toward the target (act 350). The directed sound beam is configured to actively cancel at least a portion of the detected noise directed at the target. Finally, the drone is caused to gradually approach and follow the target (act 360). Since the target may be moving, and the drone may also be moving, this process repeats, such that the directed sound beam is constantly changing its form and/or direction based on the updated distance between the drone and the target (act 320), the detected noise generated by the drone (act 330), and/or the frequency spectrum of the detected noise (act 340).

In some embodiments, the identifying the target may be performed by a processor of the drone. Alternatively, the drone may take images, and send the images to a remote control, and the remote control or a computing system connected to the remote control then processes the images to determine whether a potential target is the target. The remote control then sends its determination back to the drone, causing the drone to follow the identified target. Alternatively, or in addition, the processor of the drone may perform part of the image processing, such as identifying potential targets, and only send the images that include potential targets to the remote control for further processing.

Figure 4:
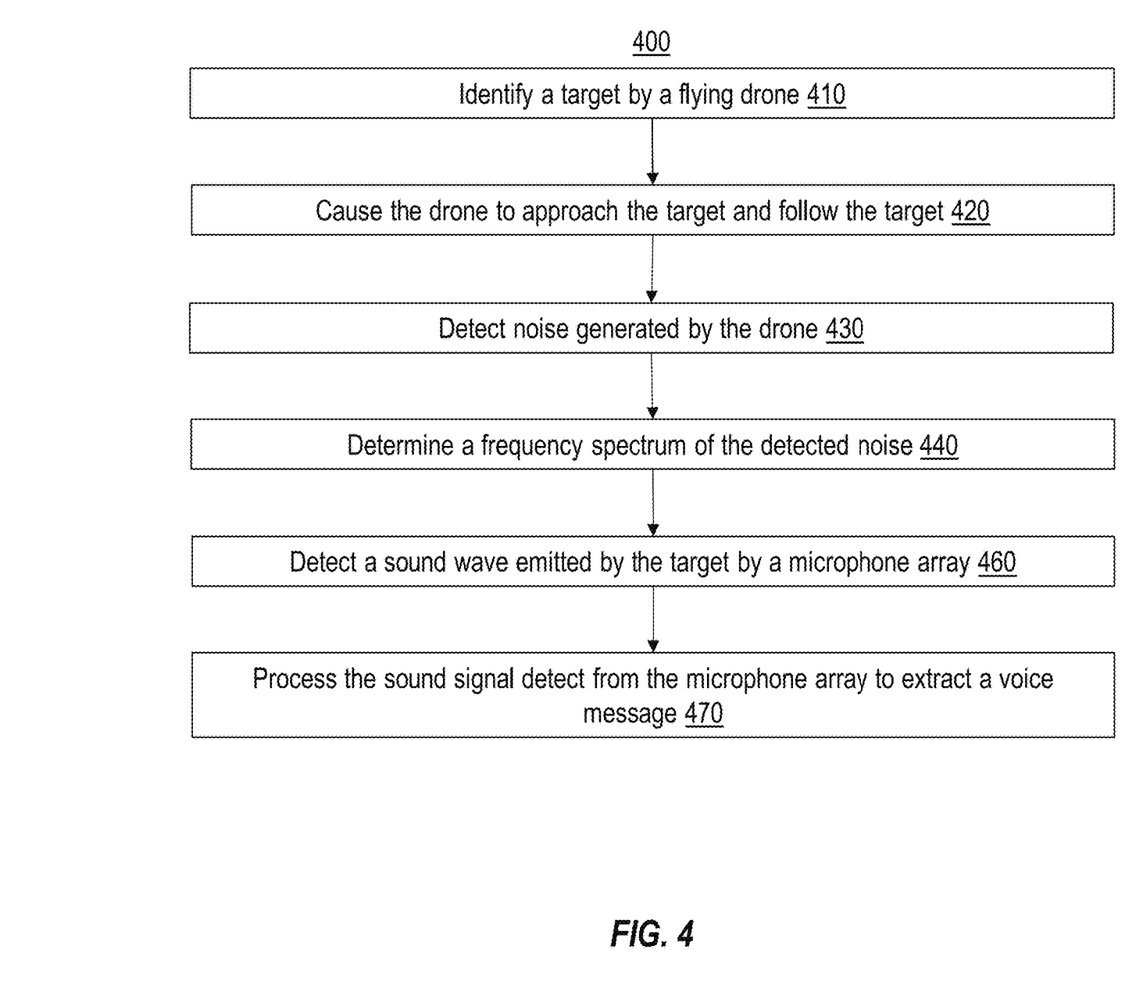
FIG. 4 illustrates a flowchart of an example of a method for detecting and processing sound waves emitted by a target by a microphone array of a drone.

FIG. 4 illustrates another flowchart of an example of a method 400 for receiving and processing sound waves emitted by a target. The method 400 includes identifying a target by a flying drone (act 410). The method 400 further includes causing the drone to gradually approach the target and follow the target (act 420). The following the target may include hovering over a target at a predetermined distance. The method 400 further includes detecting noise generated by the drone (act 430) and determining a frequency spectrum of the detected noise (act 440). The method 400 further includes detecting a sound wave emitted by the target by a microphone array (act 460). The microphone array includes a plurality of microphones that are distributed at different locations of the drone. The sound waves detected by the plurality of microphones in the microphone array are then processed to extract a voice message (act 470).

Notably, each of the plurality of microphones in the microphone array is configured to detect a sound wave. In some embodiments, the plurality of sound waves is first aggregated to generate an aggregated sound wave. The aggregated sound wave is then filtered via a sound filter to remove at least a portion of the noise and enhance the human voice. The filter is generated based on the frequency spectrum of the detected noise. The aggregated sound wave is then processed to extract the voice message. Alternatively, each of the plurality of sound waves is first filtered by the filter to generate a filtered sound wave. The plurality of filtered sound waves is then aggregated to generate an aggregated sound wave. The aggregated sound wave is then processed to extract the voice message.

In some embodiments, the processing of the sound wave may be performed by a processor of the drone. Alternatively, or in addition, the raw sound waves or semi-processed sound waves are transmitted from the drone to a remote control. The remote control or another computing system connected to the remote control then processes the received raw sound waves or semi-processed sound waves.

The methods 300 and 400 may both be performed by a single drone simultaneously, such that the drone is able to not only quietly approach and/or surveil a target visually and identify voice messages generated by the target.

Finally, because the principles described herein may be performed in the context of a computing system (for example, each of the drone 110 and the remote control 150 may include and/or be connected to one or more computing systems) some introductory discussion of a computing system will be described with respect to FIG. 5.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 5:
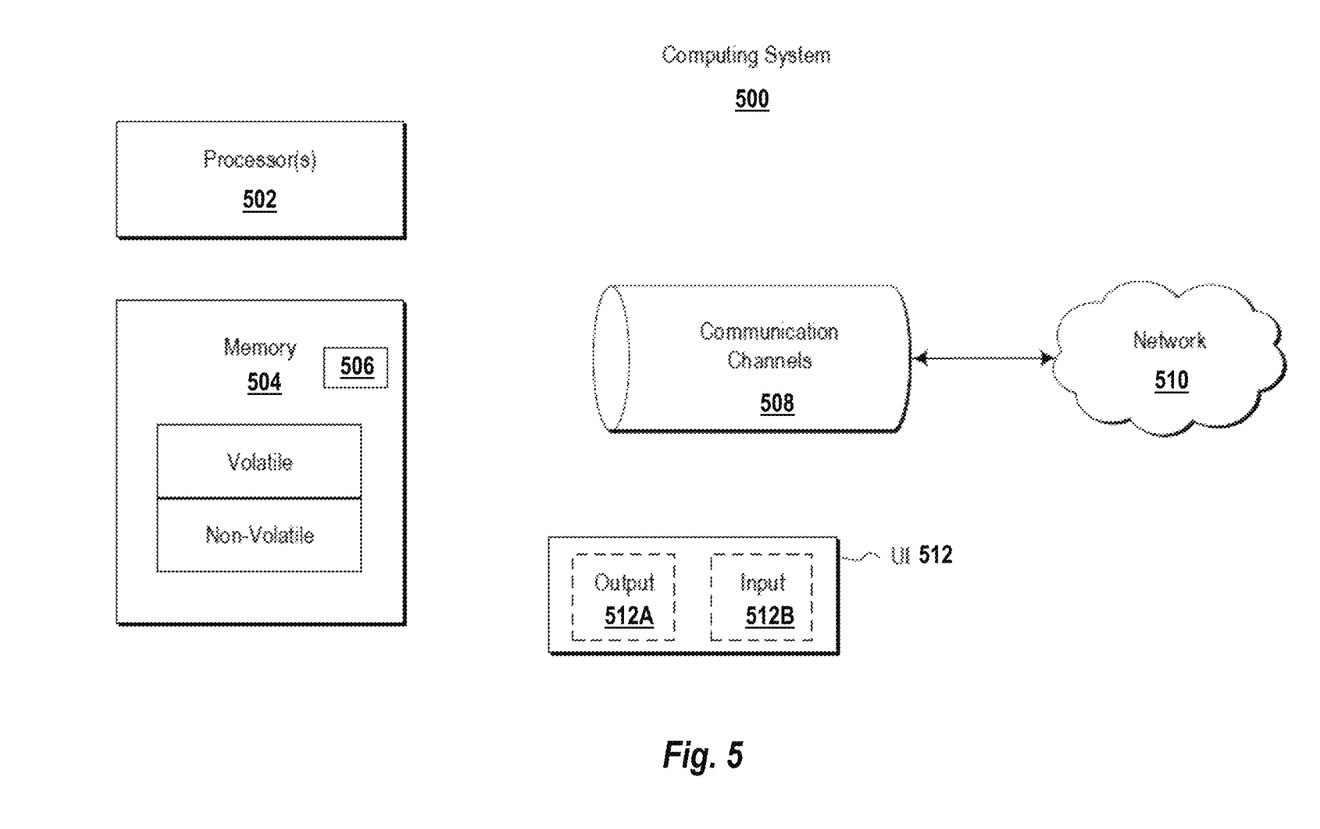
FIG. 5 illustrates an example computing system in which the principles described herein may be employed.

As illustrated in FIG. 5, in its most basic configuration, a computing system 500 typically includes at least one hardware processing unit 502 and memory 504. The processing unit 502 may include a general-purpose processor and may also include a field-programmable gate array (FPGA), an application-specific integrated circuit (ASIC), or any other specialized circuit. The memory 504 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 500 also has thereon multiple structures often referred to as an "executable component". For instance, memory 504 of the computing system 500 is illustrated as including executable component 506. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component."

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component," "agent," "manager," "service," "engine," "module," "virtual machine," or the like may also be used. As used in this description and in the case, these terms (whether expressed with or without a modifying clause) are also intended to be synonymous with the term "executable component," and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 504 of the computing system 500. Computing system 500 may also contain communication channels 508 that allow the computing system 500 to communicate with other computing systems over, for example, network 510.

While not all computing systems require a user interface, in some embodiments, the computing system 500 includes a user interface system 512 for use in interfacing with a user. The user interface system 512 may include output mechanisms 512A as well as input mechanisms 512B. The principles described herein are not limited to the precise output mechanisms 512A or input mechanisms 512B as such will depend on the nature of the device. However, output mechanisms 512A might include, for instance, speakers, displays, tactile output, holograms and so forth. Examples of input mechanisms 512B might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission's media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 500 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as hardware processing unit 502 (e.g., a processor) and memory 504, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. As another example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A drone, comprising:
a motor configured to power the drone and cause the drone to generate noise;
a computer-readable medium configured to store computer-executable instructions;
a processor configured to execute the computer-executable instructions;
a noise receiver configured to detect the noise caused by the motor;
a camera configured to capture an image of an area when the drone is flying;
a distance measurer configured to measure a distance between the drone and a particular point in the captured image; and
a directed sound beam generator configured to emit a sound beam that is directed to a particular direction;
wherein the computer-executable instructions are structured such that when the computer-executable instructions are executed by the processor, the processor is configured to:
analyze the detected noise to determine a frequency spectrum of the detected noise;
analyze the captured image to identify a target;
in response to identifying the target, cause the distance measurer to determine a distance between the drone and the target; and
cause the directed sound beam generator to emit a sound beam based on (1) the detected noise, (2) the frequency spectrum of the detected noise, (3) a relative direction of the target from the drone, or (4) the determined distance between the drone and the target, the sound beam being directed to the target and configured to actively cancel at least a portion of the detected noise.

2. The drone of claim 1, wherein:
the processor is further configured to cause the directed sound beam generator to generate a second sound beam that includes a voice message, and
the sound beam that cancels at least a portion of the detected noise and the sound beam that includes the voice message are emitted simultaneously at the target.

3. The drone of claim 1, wherein:
the directed sound beam generator comprises a gimbal configured to change a direction of the sound beam; and
based on the relative direction of the target, the processor is further configured to cause the gimbal to rotate to follow the target, such that the sound beam is continuously emitted at the target even when the target or the drone is moving.

4. The drone of claim 1, further comprising:
a wireless communication interface configured to receive an instruction wirelessly from a remote control, the instruction including information related to the target.

5. The drone of claim 4, wherein in response to receiving the instruction, the processor is further configured to:
analyze the captured image to identify a potential target;
determine whether the potential target corresponds to the information related to the target received from the instruction; and
in response to determining that the potential target corresponds to the information related to the target, identify that the potential target is the target.

6. The drone of claim 5, wherein:
in response to identifying the target, the processor is further configured to cause the camera to follow the target and keep the target at a center of each image taken, and
causes the camera to take images of the target at a predetermined time interval.

7. The drone of claim 6, wherein:
the camera is coupled to a gimbal; and
the processor is configured to cause the gimbal to rotate to keep the target at a center of each image taken by the camera.

8. The drone of claim 6, wherein the camera and the directed sound beam generator are coupled to a gimbal.

9. The drone of claim 6, wherein the processor is configured to:
record at least a subset of images in the computer-readable medium; and
transmit at least a subset of the recorded images to the remote control via the wireless communication interface.

10. The drone of claim 6, wherein the processor is further configured to cause the drone to approach the target and hover over the target at a predetermined distance.

11. The drone of claim 10, further comprising a sound receiver configured to receive and process a sound wave emitted from or around the target to extract a voice message.

12. The drone of claim 11, wherein the processor is further configured to transmit the voice message to the remote control via the wireless communication interface.

13. The drone of claim 11, the sound receiver further comprising a microphone array having a plurality of microphones, each of which is placed at a different location of an outer surface of the drone and configured to receive a sound wave.

14. The drone of claim 13, wherein the noise receiver and the sound receiver share the microphone array, such that the microphone array is configured to detect both the noise and the sound wave emitted by the target.

15. The drone of claim 13, wherein the processor is further configured to:

record the sound wave received from each of the plurality of microphones in the computer-readable medium; and process the recorded sound waves to extract a voice message.

16. The drone of claim 15, wherein the processing of the recorded sound waves comprises generating a noise filter based on the detected noise and the spectrum of the detected noise, the noise filter configured to filter out at least a portion of the frequency spectrum of the detected noise from the received sound waves.

17. The drone of claim 16, wherein the processing of the recorded sound waves further comprises:

for each sound wave received from each of the plurality of microphones, using the noise filter to process the sound wave to reduce noise and enhance human voice to generate a processed sound wave;

aggregating the processed sound waves into an aggregated sound wave; and extracting the voice message from the aggregated sound wave.

18. The drone of claim 16, wherein the processing of the recorded sound waves further comprises:

aggregating the sound waves received from the plurality of microphones into an aggregated sound wave;

using the noise filter to process the aggregated sound wave to reduce noise and enhance human voice to generate a filtered sound wave; and extracting the voice message from the filtered sound wave.

19. The drone of claim 1, wherein the noise receiver includes a sensor coupled to the motor or an outer surface of the drone.

20. A method implemented j a drone for actively cancelling its own noise directed at a target, the method comprising:

detecting a noise caused by a motor of the drone;

analyzing the noise to determine a frequency spectrum of the detected noise;

identifying the target;

determining a distance between the drone and the target;

emitting a sound beam based on (1) the detected noise, (2) the frequency spectrum of the detected noise, (3) a relative direction of the target from the drone, or (4) the detected distance between the drone and the identified target, the sound beam being directed to the target and actively cancelling at least a portion of the detected noise;

receiving a sound wave emitted from the target or around the target by a microphone array; and processing the sound wave received by the microphone array to extract a voice message.

* * * * *

UNITED STATES PATENT AND TRADEMARK OFFICE
CERTIFICATE OF CORRECTION

| | | |
|---|---|---|
| PATENT NO. | : 11,990,113 B2 | Page 1 of 1 |
| APPLICATION NO. | : 17/659682 | |
| DATED | : May 21, 2024 | |
| INVENTOR(S) | : George Matus and Shawn Ray Nageli | |

It is certified that error appears in the above-identified patent and that said Letters Patent is hereby corrected as shown below:

In the Claims

Column 16, Line 6, Claim 10, the text 'j' should be replaced with -- by --

Signed and Sealed this
Seventeenth Day of September, 2024

*Katherine Kelly Vidal*

Katherine Kelly Vidal
*Director of the United States Patent and Trademark Office*